(12) United States Patent
Knight

(10) Patent No.: X8465
(45) Date of Patent: Oct. 23, 1834

(54) BORING TIMBER FOR MORTISING

(76) Inventor: Benjamin Knight

Benjamin Knight
Letters Patent.

The Schedule referred to in these Letters Patent, and making part
of the same, containing a description in the words of the said Benjamin
Knight himself of his improvement in a machine for boring timber
for morticing, in the framing of buildings of all descriptions.

To all whom it may concern, be it known, that I, Benjamin Knight
of Cranston, in the County of Providence, and State of Rhode Island
have invented a machine for boring timber for morticing in the framing
of buildings; and the following is a full and exact description thereof.
I construct a square frame, which, for ordinary purposes, I make
of stuff of about an inch and a quarter square. The frame may be
about twenty inches long, eight wide, and six high from out to out.
This frame consists of twelve pieces of stuff, the four corner posts having
longitudinal and end pieces formed into them, both at their upper &
lower ends. This frame is to be fastened to the timber which is to be bored
and is to support a second frame, which I call a slide and which carries
the auger with its gearing and other apparatus employed in turning it.
The slide is a frame which extends across, and rests upon the longitudi-
nal pieces of the main frame, and is capable of slipping from one end
thereof to the other; this slide may be eight inches in length more or
less, and may be made of stuff of about the same size with the main
frame. Two uprights rise from the top pieces of this frame to the height
of ten or twelve inches, and are connected together at top by a cross or
cap piece. There are grooves within the inner edges of these uprights,
within which a guide piece runs, which receives the upper end of the
auger shank or shaft; and in which it revolves. This shaft works
up and down between the uprights like a saw between the fender
posts of a saw mill frame. The guide piece extends across from one
groove to the other, and slides freely within them. Attached to
the the slide is a collar, in which the lower part of the auger shaft revolves, and this shaft being cylindrical, slides freely up and down through this collar. The point of the auger when it is raised is just above the lower edge of the main frame. In order to turn the auger shaft, I place on it a small bevel wheel having a tube in its centre, through which the shank or shaft slides, and a feather which fits into a groove made along the shaft, by which means when turned, it turns the shaft also. A second bevel wheel fixed to a horizontal shaft and having its bearings on the slide serves, by means of a crank, to cause the auger to revolve.

From the top of the guide in which the auger shaft revolves, a chain or cord passes over the pulleys, its end being attached to a lever, by depressing which the auger is raised. Its own weight is generally sufficient to carry it down by the aid of its lever; a contrivance however may be added to draw or force it down when necessary. Upon the upper longitudinal timber, on one side of the frame, I fix a plate of metal perforated with holes to receive the point of an index attached to the slide; making several divisions upon said plate, that they may gauge the distances required for augers of different sizes. In order to fasten the apparatus upon the timber which is to be bored, I provide double hooks, or cramps of Iron, which take hold of the timber, and are attached to the frame by staples through which they slide, to allow the adjustment of the auger to the part desired. These cramps may be made in different ways, but the form which I prefer, is that represented in the drawing deposited in the Patent Office. What I claim as my invention, and for which I ask a Patent, is, the slide placed upon the main frame, and capable of being moved from end to end thereof, without removing the frame from the timber to be bored. I also claim the clamps to which I have referred, for the purpose of holding the frame on to the timber; not intending to confine myself to the particular forms or dimensions mentioned by me, but to vary ... the same in any manner which I may prefer, whilst I proceed upon the same same principle and produce similar effects.

Witnesses
Leonard Whitney
Joseph Huggins

Benjamin Knight

Ex d
1836.

(784 Words)

(Granted October 23. 1834.)